United States Patent
Bakshi et al.

(10) Patent No.: US 8,290,138 B2
(45) Date of Patent: Oct. 16, 2012

(54) SYSTEMS, METHODS, APPARATUS AND COMPUTER PROGRAM PRODUCTS FOR SHARING RESOURCES BETWEEN TURRET SYSTEMS AND PBXS USING SIP

(75) Inventors: Aseem Bakshi, Stamford, CT (US); Daniel R. Elliott, Southbury, CT (US); Rajnish Jain, Fairfield, CT (US); Timothy Potts, East Haven, CT (US); Elias Koutikas, Seymour, CT (US)

(73) Assignee: IPC Systems, Inc., Jersey City, NJ (US)

( * ) Notice: Subject to any disclaimer, the term of this patent is extended or adjusted under 35 U.S.C. 154(b) by 1303 days.

(21) Appl. No.: 11/943,800

(22) Filed: Nov. 21, 2007

(65) Prior Publication Data
US 2009/0022299 A1 Jan. 22, 2009

Related U.S. Application Data

(60) Provisional application No. 60/950,934, filed on Jul. 20, 2007.

(51) Int. Cl.
*H04M 7/00* (2006.01)
*H04L 12/66* (2006.01)

(52) U.S. Cl. ........................ 379/229; 370/352

(58) Field of Classification Search ............... 370/352, 370/353, 354, 355, 356, 357, 358, 359; 379/265, 379/266, 220.01, 221, 224, 225, 227, 232; 455/435
See application file for complete search history.

(56) References Cited

U.S. PATENT DOCUMENTS

| | | | | |
|---|---|---|---|---|
| 7,542,462 B1 * | 6/2009 | Murphy | | 370/352 |
| 7,610,384 B1 * | 10/2009 | Schulzrinne et al. | | 709/227 |
| 7,664,101 B1 * | 2/2010 | Croak et al. | | 370/352 |
| 2004/0165578 A1 * | 8/2004 | Burritt et al. | | 370/352 |
| 2005/0094621 A1 * | 5/2005 | Acharya et al. | | 370/352 |
| 2005/0141483 A1 * | 6/2005 | Wengrovitz | | 370/352 |
| 2006/0098624 A1 * | 5/2006 | Morgan et al. | | 370/352 |
| 2007/0064672 A1 * | 3/2007 | Raghav et al. | | 370/351 |
| 2007/0070980 A1 * | 3/2007 | Phelps et al. | | 370/352 |
| 2008/0037481 A1 * | 2/2008 | Chiang et al. | | 370/338 |
| 2008/0137814 A1 * | 6/2008 | Williams et al. | | 379/67.1 |
| 2008/0267170 A1 * | 10/2008 | Allen et al. | | 370/352 |
| 2009/0147772 A1 * | 6/2009 | Rao et al. | | 370/352 |
| 2009/0290695 A1 * | 11/2009 | Schulzrinne et al. | | 379/93.02 |

OTHER PUBLICATIONS

A No Soliciting Simple Mail Transfer Protocol (SMTP) Service Extension, RFC 3865, Sep. 2004.
A Message Summary and Message Waiting Indication Event Package for the Session Initiation Protocol (SIP), RFC 3842, Aug. 2004.
A Presence Event Package for the Session Initiation Protocol (SIP), RFC 3856, Aug. 2004.

(Continued)

*Primary Examiner* — Ahmad Matar
*Assistant Examiner* — Kharye Pope
(74) *Attorney, Agent, or Firm* — Fitzpatrick, Cella, Harper & Scinto

(57) ABSTRACT

Systems, methods, apparatus and computer program products are provided for sharing one or more resources across a turret system and a telephone exchange including an agent. The agent is configured to register into the telephone exchange as a predetermined device and to receive a state change notification of a resource from at least one of the telephone exchange and the turret system. Receipt of the state change notification causes the agent to change a state of a corresponding resource.

18 Claims, 14 Drawing Sheets

OTHER PUBLICATIONS

Session Initiation Protocol (SIP)—Specific Event Notification, RFC 3265, Jun. 2002.
The Session Initiation Protocol (SIP) Update Method, RFC 3311, Sep. 2002.
An Invite-Initiated Dialog Event Package for the Session Initiation Protocol (SIP), RFC 4235, Nov. 2005.
SIP: Session Initiation Protocol, RFC 3261, Jun. 2002.
Enterprise SIP Server Release 1.0, Administration Guide, Revision A.
Enterprise SIP Server Release 1.0, Installation & Maintenance Manual, Revision B.
Alliance MX 12.1, Release Notes, Feb. 2006.
Alliance MX Release 12.1, Switching Center Cards Handbook, Dec. 2005.

* cited by examiner

```
SUBSCRIBE sip:201401145@159.63.78.235:506 SIP/2.0
From: <sip:201401145@159.63.77.95:5072>;tag=b58c0668-5f4d3f9f-13d0-45026-
195242-2d2c8897-195242
To: <sip:201401145@159.63.77.95:5072>
Call-ID: b5811150-5f4d3f9f-13d0-45026-195242-4533f661-195242
CSeq: 1 SUBSCRIBE
Via: SIP/2.0/UDP 159.63.77.95:5072;branch=z9hG4bK-195242-62e95287-b2490d4
Expires: 3600
Accept: application/x-ipc-resource-status-info
Max-Forwards: 70
Event: x-ipc-resource-status
Contact: <sip:159.63.77.95:5072>
Content-Length: 0
```
⎫
⎬ 1302
⎭

```
SIP/2.0 200 OK
From: <sip:201401145@159.63.77.95:5072>;tag=b58c0668-5f4d3f9f-13d0-45026-
195242-2d2c8897-195242
To: <sip:201401145@159.63.77.95:5072>;tag=e31978-0-13c4-45026-7f39f-
6a17522d-7f39f
Call-ID: b5811150-5f4d3f9f-13d0-45026-195242-4533f661-195242
Cseq: 1 SUBSCRIBE
Expires: 600
Via: SIP/2.0/UDP 159.63.77.95:5072;branch=z9hG4bK-195242-62e95287-b2490d4
Supported: 100rel,timer,replaces,from-change
User-Agent: IPC SIP LC - 15.00.00a
Contact: <sip:201401145@159.63.78.235:5060>
Content-Length: 0
```
⎫
⎬ 1304
⎭

```
NOTIFY sip:159.63.77.95:5072 SIP/2.0
From: <sip:201401145@159.63.77.95:5072>;tag=e31978-0-13c4-45026-7f39f-
6a17522d-7f39f
To: <sip:201401145@159.63.77.95:5072>;tag=b58c0668-5f4d3f9f-13d0-45026-
195242-2d2c8897-195242
Call-ID: b5811150-5f4d3f9f-13d0-45026-195242-4533f661-195242
Cseq: 1 NOTIFY
Via: SIP/2.0/UDP 159.63.78.235:5060;branch=z9hG4bK-7f39f-1f0fa702-4908ee45
Subscription-State: active
Event: x-ipc-resource-status
Max-Forwards: 70
Supported: 100rel,timer,replaces,from-change
User-Agent: IPC SIP LC - 15.00.00a
Contact: <sip:201401145@159.63.78.235:5060>
Content-Type: application/x-ipc-resource-status-info
Content-Length: 47
```
⎫
⎬ 1306
⎭

```
Extn=201401145
Status=Idle
CallSrc=Ext
CLI=No
```
⎫
⎬ 1308
⎭

*FIG. 13A*

```
SIP/2.0 200 OK
From: <sip:201401145@159.63.77.95:5072>;tag=e31978-0-13c4-45026-
7f39f-6a17522d-7f39fTo:
<sip:201401145@159.63.77.95:5072>;tag=b58c0668-5f4d3f9f-13d0-
45026-195242-2d2c8897-195242
Call-ID: b5811150-5f4d3f9f-13d0-45026-195242-4533f661-195242
Cseq: 1 NOTIFY
Via: SIP/2.0/UDP 159.63.78.235:5060;branch=z9hG4bK-7f39f-
1f0fa702-4908ee45
Contact: <sip:159.63.77.95:5072>
Content-Length: 0
```
⎫
⎬ 1310
⎭

```
NOTIFY sip:159.63.77.95:5072 SIP/2.0
From: <sip:201401147@159.63.77.95:5072>;tag=e35050-0-13c4-45026-
7f5f2-8d27404-7f5f2
To: <sip:201401147@159.63.77.95:5072>;tag=b58c0998-5f4d3f9f-13d0-
45026-195495-8040ce-195495
Call-ID: b5811500-5f4d3f9f-13d0-45026-195495-428fc928-195495
Cseq: 2 NOTIFY
Via: SIP/2.0/UDP 159.63.78.235:5060;branch=z9hG4bK-7f610-
1f193137-4fd76558
Subscription-State: active
Event: x-ipc-resource-status
Max-Forwards: 70
Supported: 100rel,timer,replaces,from-change
User-Agent: IPC SIP LC - 15.00.00a
Contact: <sip:201401147@159.63.78.235:5060>
Content-Type: application/x-ipc-resource-status-info
Content-Length: 47
```
⎫
⎬ 1312
⎭

```
Extn=201401145
Status=Busy
CallSrc=Ext
CLI=No
```
⎬ 1314

```
SIP/2.0 200 OK
From: <sip:201401147@159.63.77.95:5072>;tag=e35050-0-13c4-45026-
7f5f2-8d27404-7f5f2
To: <sip:201401147@159.63.77.95:5072>;tag=b58c0998-5f4d3f9f-13d0-
45026-195495-8040ce-195495
Call-ID: b5811500-5f4d3f9f-13d0-45026-195495-428fc928-195495
Cseq: 2 NOTIFY
Via: SIP/2.0/UDP 159.63.78.235:5060;branch=z9hG4bK-7f610-
1f193137-4fd76558
Contact: <sip:159.63.77.95:5072>
Content-Length: 0
```
⎫
⎬ 1316
⎭

FIG. 13B

SYSTEMS, METHODS, APPARATUS AND COMPUTER PROGRAM PRODUCTS FOR SHARING RESOURCES BETWEEN TURRET SYSTEMS AND PBXS USING SIP

CROSS REFERENCE TO RELATED APPLICATIONS

This application claims priority to, and the benefit of, U.S. Provisional Patent Application Ser. No. 60/950,934, filed Jul. 20, 2007, which is hereby incorporated by reference in its entirety.

BACKGROUND

Field

The present invention generally relates to telecommunication systems, and more particularly to telephony switching systems.

A turret system is a specialized telephony switching system that allows a relatively small number of users to access a large number of external lines and provides enhanced communication features such as hoot-n-holler, push-to-talk, intercom, video and large-scale conferencing. These features are often utilized in the financial industry such as trading floor environments, as well as security/law enforcement, utilities, healthcare, and customer support (e.g., contact centers) environments.

Users interface with a turret system through a turret device, which is a phone-like desktop device with multiple handsets and speakers and multiple buttons. A turret is either implemented in dedicated hardware (sometimes referred to as a "hard" turret) or general-purpose computer (sometimes referred to as a "soft" turret). With the advent of Voice over Internet Protocol ("VoIP"), VoIP turret devices have moved from a fixed environment of dedicated voice communications trading resources to a more virtualized trading environment across multiple sites. This virtual environment allows resources to be shared dynamically, when and where required, across a global corporate enterprise.

A telephony switching system, such as a Private Branch eXchange ("PBX") or a turret system, typically provides two kinds of communications interfaces, namely, station and trunk interfaces. A station interface connects phone users with a telephony system, and a trunk interface interconnects telephony systems. The trunk interface also can be used to connect private systems with telephony switches in a public switched telephone network ("PSTN") to, for example, exchange calls between a private organization and PSTN.

With the introduction of Session Initiation Protocol ("SIP") based architectures, new features and tighter integration between the turret and telephone exchanges provide enhanced sharing of capabilities. SIP is an application-layer control (i.e., signaling) protocol for creating, modifying, and terminating sessions such as Internet telephony calls with one or more participants and is defined in RFC-3261, "SIP: Session Initiation Protocol," which is incorporated by reference herein in its entirety.

It would be useful to have a more advanced interface which allows sharing of resources across two telephony/switching systems without the need for custom, non-standardized, vendor-specific computer telephony integration ("CTI") solutions. It would also be useful to emulate a SIP trunk interface to deliver resource sharing using standardized SIP technology.

BRIEF DESCRIPTION OF THE INVENTION

The present invention meets the above-identified needs by providing systems, methods, apparatus and computer program products for sharing resources between turret systems and PBXs using SIP. In an example embodiment an apparatus for sharing one or more resources across a turret system and a telephone exchange is provided. The apparatus includes an agent configured to register into the telephone exchange as a predetermined device and to receive a state change notification of a resource from at least one of the telephone exchange and the turret system. Receipt of the state change notification causes the agent to change a state of a corresponding resource.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIGS. 13A and 13B are example line traces showing SIP packet messages related to a shared line resource.

DETAILED DESCRIPTION OF THE INVENTION

Example embodiments of the present invention are now described in more detail herein in terms of a turret/PBX communications system. This is for convenience only and is not intended to limit the application of the present invention. In fact, after reading the following description, it will be apparent to one skilled in the relevant art(s) how to implement the following invention in alternative embodiments (e.g., strictly private or public systems, or a combination of both).

Figure 1:
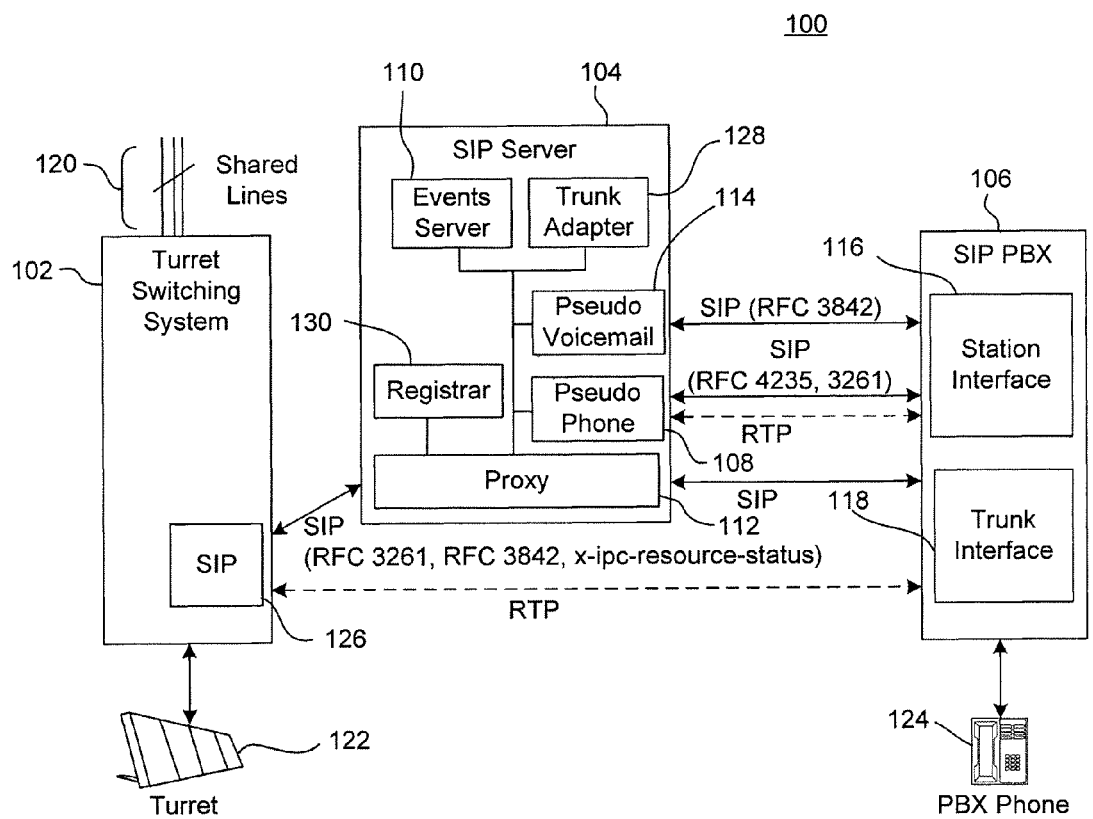
FIG. 1 depicts a block diagram of a system for sharing resources between turret systems and SIP PBXs in accordance with an example embodiment of the present invention.

FIG. 1 depicts a block diagram of a communications system 100 for sharing resources between turret systems and SIP enabled PBXs in accordance with an example embodiment of the present invention. As shown in FIG. 1, communications system 100 includes a SIP enabled turret system 102, a SIP server 104 and a SIP enabled PBX 106. A turret 122 in communication with turret system 102 provides a user interface for the resources provided by communication system 100 and a SIP line card 126 operates as a SIP gateway to the turret system's switching fabric. SIP server 104 includes a pseudo-phone 108, which is a SIP Back-to-Back User Agent automaton ("B2BUA"). The pseudo-phone uses one user agent ("UA") context to communicate with an events server 110 and another UA context to communicate with PBX 106. SIP server 104 also includes a proxy 112, which together with the events server 110 manage messaging by caching the states of the resources in communications system 100. Another SIP B2BUA automaton, trunk adapter 128 provides trunk interconnections between turret system 102 and PBX 106. SIP server 104 also includes a registrar 130 collocated with proxy 112 for processing and storing registration requests from a client that initiates a SIP request (e.g., PBX 106). A pseudo-voicemail 114, also a SIP B2BUA automaton, is included in SIP server 104 to emulate a voicemail resource on PBX 106. PBX 106 includes a logical station interface 116 through which various station devices (e.g., telephone, fax machine, data, modem, video device, and the like) interact with the system. PBX also includes a logical trunk interface 118 for coupling telephony systems. A PBX phone 124 in communication with PBX 106 provides another user interface for the resources provided by communication system 100.

Generally, system 100 uses specialized SIP UA automata to communicate with PBX 106 over a station interface 116, to extract a SIP feature set available over that interface and to emulate a SIP trunk interface 118 provided by PBX 106106. This allows standardized resource sharing with SIP PBXs without requiring enhancements to the PBX software.

In an example embodiment, telephone lines are shared through an automaton, pseudo-phone 108, and a trunk adapter 128, both of which are implemented as SIP Back-To-Back User Agents ("B2BUAs"). The Pseudo-phone 108 registers with PBX 106, as a phone device. It then subscribes to the PBX for line state change notifications through a SIP protocol extension called dialog-package defined in RFC 4235. As a result, Pseudo-Phone becomes part of a bridged line appearance ("BLA") group in the PBX. By becoming a part of the BLA group, pseudo-phone 108 is able to receive SIP dialog-package state notifications pertinent to the state changes of the line shared by the members of the BLA group. In addition, the subscription to the BLA group gives Pseudo-Phone the ability to force the BLA line to be in particular state by placing, receiving, and picking up held calls on the BLA line. Pseudo-phone 108 also subscribes to turret system 102 through the events server 110 for line state change notifications.

Pseudo-phone 108 listens for line state changes from both the turret system 102 and PBX 106, and ensures that the line states are consistent across the two systems. For instance, if a turret 122 user seizes a shared line 120, pseudo-phone 108 receives a corresponding notification and places an outbound call in the PBX 106 to render the shared line busy to the PBX phone users (e.g., a user of PBX Phone 124). The call originated by pseudo-phone 108 in the PBX 106 is answered by the trunk adapter 128.

Figure 2:
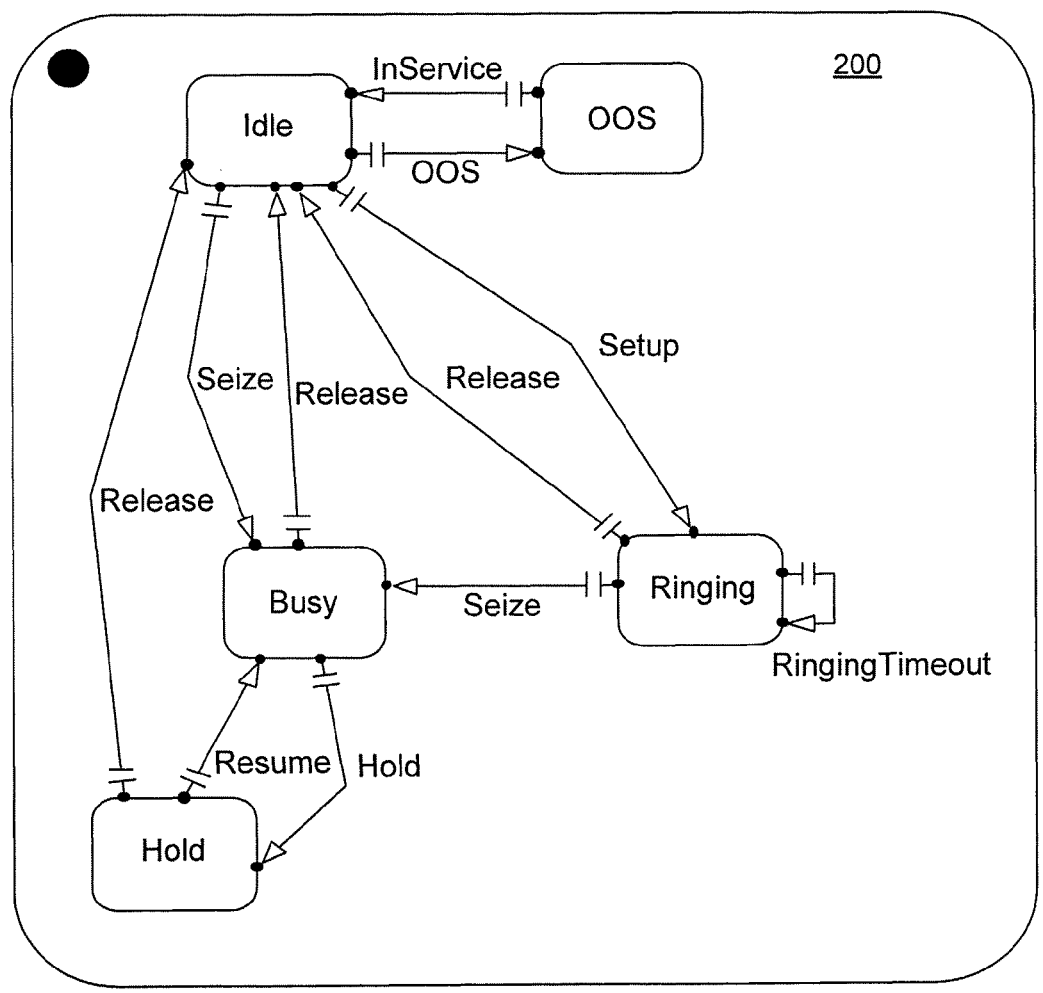
FIG. 2 depicts a finite state machine for a PBX or turret system line resource implemented in a SIP automaton called pseudo-phone in accordance with an example embodiment of the present invention.

FIG. 2 depicts an example finite state machine 200 for a PBX or turret system line resource implemented in a pseudo-phone automaton. A pseudo-phone 108 (FIG. 1) keeps track of the following states: idle, out-of-service ("OOS"), busy, ringing or hold. From an idle state, the pseudo-phone can seize the line, which in turn causes the line state to switch to a busy state until it is released. While in the busy state, the pseudo-phone can place the line in a hold state, which, when released, returns the line to the idle state. Alternatively, if the call placed on hold is resumed, the pseudo-phone returns the line to a busy state.

The pseudo-phone also can generate setup signals to emulate a ringing state which upon release causes the line to be returned to its idle state. If the line is seized during a ringing state the line state changes to busy. A ringing timeout also can be incorporated. In addition, the pseudo-phone can generate an out-of-service ("OOS") signal to emulate an out-of-service state until it is placed back into service ("InService").

Referring back to FIG. 1, another resource, voicemail, is shared through another automaton, pseudo voicemail 114, which also is implemented as a SIP B2BUA. Particularly, pseudo-voicemail 114 is communicatively coupled to PBX 106 and allows a voicemail system on PBX 106 to be operated as if it were a part of turret system 102. This is accomplished by using one UA context to communicate with the events server 110 and another UA context to communicate with PBX 106. Similar to the pseudo-phone 108, pseudo-voicemail 114 appears as a phone user to PBX 106.

Turret system 102 subscribes to pseudo-voicemail 114 for message waiting indications as if it were communicating with PBX 106 over the PBX's SIP trunk interface 118. Similarly, pseudo-voicemail 114 registers with PBX 106 and using the message-summary SIP event package defined in RFC 3842 subscribes for message waiting notifications for a particular extension's mailbox. When a user leaves a message for a turret system user, PBX 106 sends a SIP message waiting indication ("MWI") NOTIFY to pseudo-voicemail 114. Pseudo-voicemail 114 propagates the event to the turret system 102 via SIP line card 126, which, in turn, sends a signal to a turret 122 to notify the turret user of the pending voicemail. The signal may, for example, cause a light indicator or turret 122 to be activated.

Sharing resources renders turret systems and PBXs as a single virtual telephony system, where the users of the individual systems can access resources available across the networked systems without knowing where the resources actually reside. Example system 100 is not limited to sharing phone and voicemail resources as described above. Other resources, such as conference mixers, tones and announcements playback servers, recorders can be implemented into such communication systems using the techniques described herein.

In order to convey line states from the SIP line card 126 to events server 118 and from events server 110 to any of the entities that have subscribed for the line states, a SIP event-package is defined to decouple line states and call control from each other. An example event-package is specified below:

| Event Package Token Name = | x-ipc-resource-status |
| MIME Type = | x-ipc-resource-status-info |

These tokens are used in Accept, Event, and Content-Type headers as follows:
In a SUBSCRIBE message:

| Accept: | application/x-ipc-resource-status-info |
| Event: | x-ipc-resource-status |

In a NOTIFY message:
Content-Type: application/x-ipc-resource-status-info

In an example embodiment, the SIP body format for x-ipc-resource-status event package is ASCII text based and includes lines of name-value pairs. Example name-value pairs are described below, where each line contains one name-value pair and are demarcated by a carriage-return (i.e., CR) and line-feed (i.e., LF) sequence. The value of the Accept field in a subscription request indicates the type of message body the source of the request (e.g., pseudo-phone 108) can accept. The value of the Event field in a subscription request indicates the SIP event-package that is being subscribed to (e.g., resource status, voicemail, etc.).

An "Extn" parameter identifies the extension (or line) resource whose state is being communicated. In an example embodiment, the "Extn" parameter has the following format:
Extn=Numeric string of characters A "status" parameter represents the status of a resource. Exemplary values of the status parameter include: Idle, Busy, Hold, Ring, and Out-of-Service ("OOS"). In an example embodiment, the "status" parameter has the following format:
Status="Idle" | "Busy" | "Hold" | "Ring" | "OOS"

A "CLI" parameter indicates whether the CLI (calling line identification) is being provided in a SIP NOTIFY message. In an example embodiment, the "CLI" parameter has the following format:
CLI="No" | "Yes"

A "CLINum" parameter indicates the phone number of the calling party. In an example embodiment, the "CLINum" parameter has the following format:
CLINum=Numeric string of characters A "CLIName" parameter indicates the name of the calling party. In an example embodiment, the "CLIName" parameter has the following format:
CLIName=Alpha-numeric string of characters The "CallSrc" field indicates whether the call is from an internal or external source. This field is used, for example, to deliver different kinds of rings to the turret users depending on the call source. In an example embodiment, the "CallSrc" parameter has the following format:
CallSrc="Ext" | "Int"

A "CFType" parameter indicates that a call is being forwarded and the reason for call forwarding. The possible values are: None, Immediate ("Imm"), Busy, Invalid ("INV"), Ring No-Answer ("RNA") and Busy Ring No-Answer ("BRNA"). In an example embodiment, the "CFType" parameter has the following format:
CFType="None" | "Imm" | "Busy" | "INV" | "RNA" | "BRNA"

A "CFExt" parameter indicates the extension that a call is forwarded to based on immediate or busy conditions. In an example embodiment, the "CFExt" parameter has the following format:
CFExt=Numeric string of characters A "CFRNAExt" parameter indicates the extension that a call is being forwarded to when the forwarding is due to ring-no-answer. In an example embodiment, the "CFR-NAExt" parameter has the following format:
CFRNAExt=Numeric string of characters Several example resource sharing scenarios will now be described with reference to FIGS. 3-12. For completeness, standard SIP protocol handshaking and authentication communications are depicted in the figures, such as a SIP 200 "OK" (i.e., handshaking) message and a SIP 401 (i.e., authentication) message. For simplicity, however, these communications are not discussed in detail below.

Figure 3:
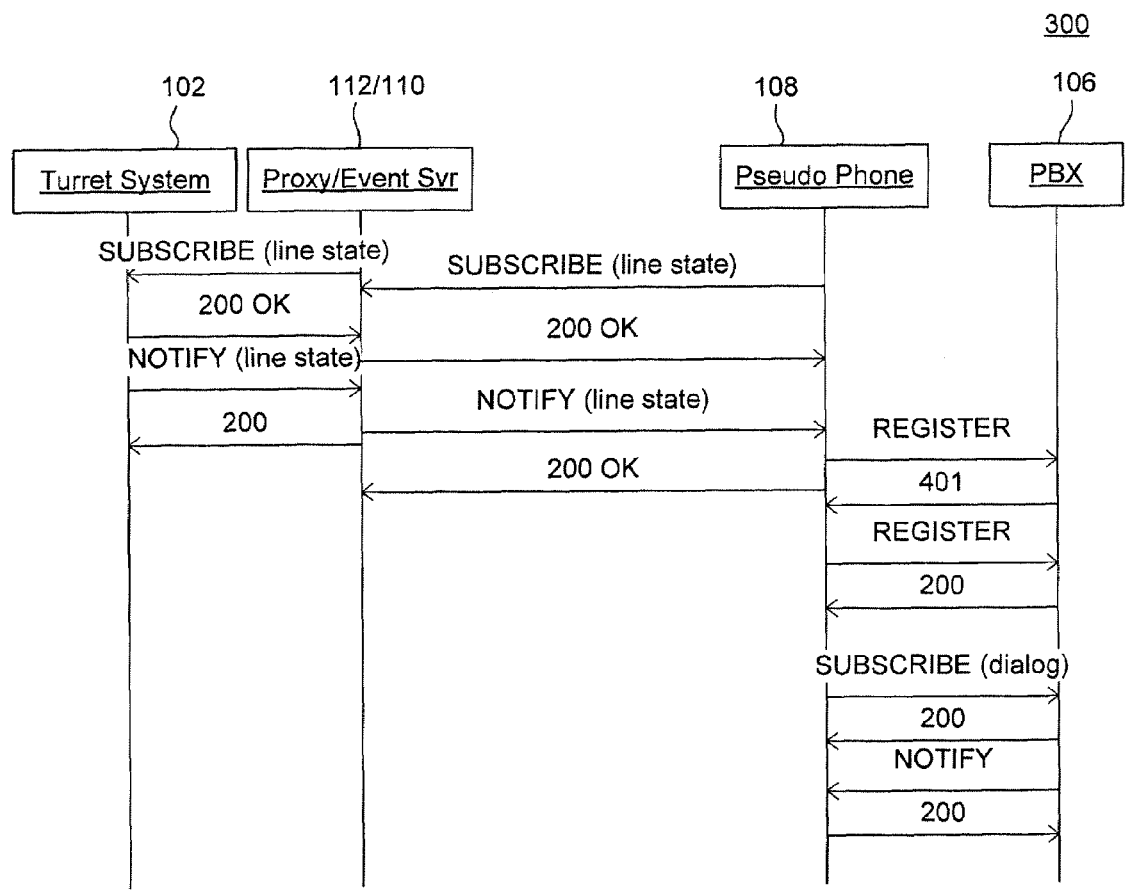
FIG. 3 depicts a startup process where a pseudo-phone subscribes to a turret system through an events server and proxy to be notified of line state change notifications in accordance with an example embodiment of the present invention.

FIG. 3 depicts an example startup process 300 for subscribing pseudo-phone 108 to turret system 102 through proxy 112 and events server 110 (collectively "Proxy/Event Svr 112/110") to communicate line state change notifications. Initially, the Proxy/Event Svr 112/110 requests all the line states for turret system 102 with a SUBSCRIBE (line state) request. In response, turret system 102 responds by communicating the status of its resources. This is accomplished by responding with a NOTIFY (line state) message including the line state information. In turn, Proxy/Event Svr 112/110 propagates the NOTIFY (line state) message of turret system 102 to pseudo-phone 108.

Pseudo-phone 108 registers with PBX 106 with a REGISTER request message, and, after it has been authenticated, subscribes with PBX 106 for line state change notifications using a SUBSCRIBE (dialog) message. This allows the phone 124 on PBX 106 and the turret device 122 on turret system 102 to have the same line states. Particularly, a SUBSCRIBE (dialog) message from pseudo-phone 108 causes PBX 106 to respond with a NOTIFY response message including the line state. Similarly, any time a change in status on the shared line occurs, whether on the turret system or the PBX side, the corresponding system will generate a NOTIFY (line state) message with this information.

Figure 4:
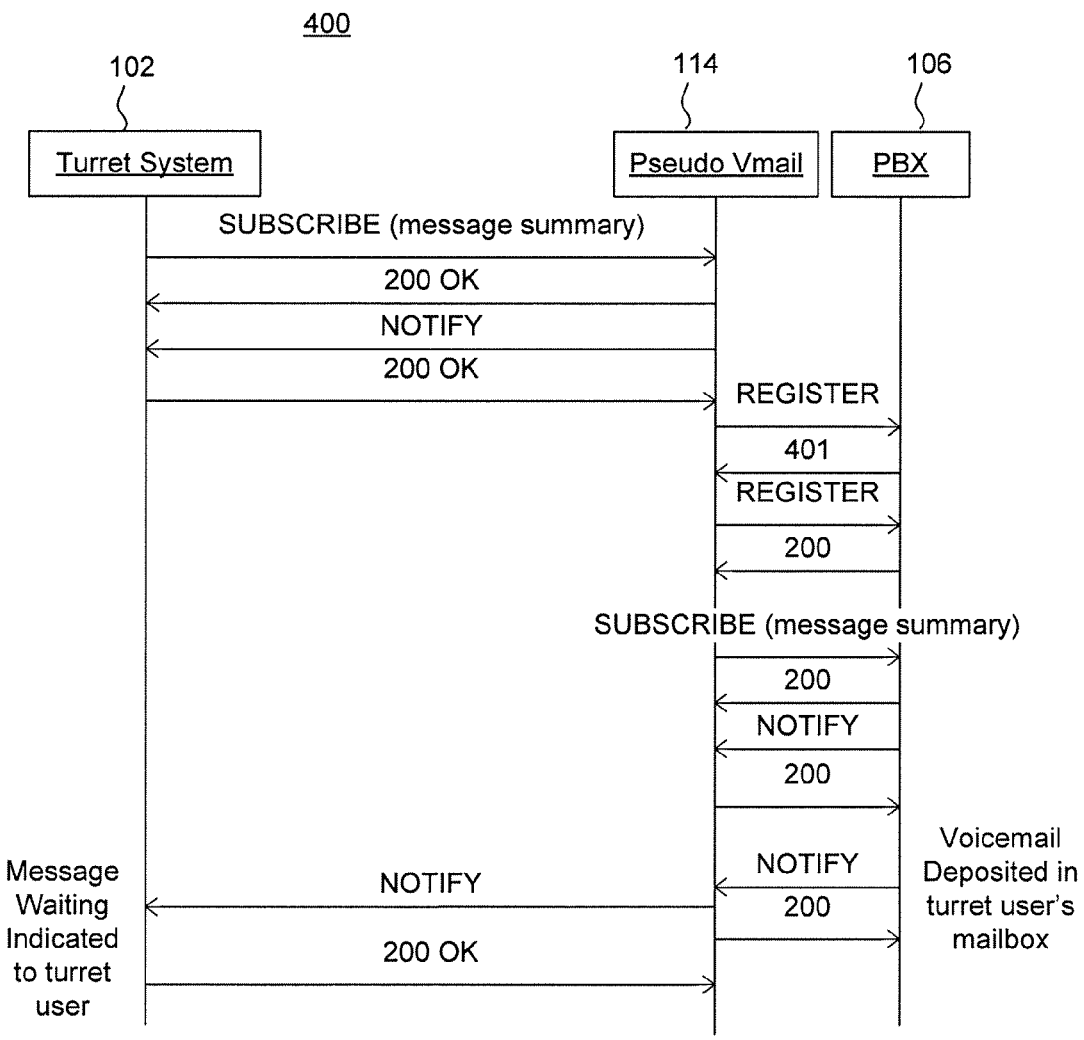
FIG. 4 depicts a startup scenario for subscribing a turret system to a SIP automaton called pseudo voicemail for message waiting indications in accordance with an example embodiment of the present invention.

FIG. 4 depicts an example startup process 400 for subscribing a turret system to pseudo-voicemail for message waiting indications. In this example, turret system 102 shares the voicemail system on PBX 106. Turret system 102 subscribes to a voicemail by sending the pseudo-voicemail 114 a SUBSCRIBE (message summary) message. This message contains an Accept field having a value indicating what type of message (e.g., NOTIFY message) turret system 102 expects to receive in return. After registration, pseudo-voicemail 114 subscribes to PBX 106 for voicemail features. After both registration and subscription with PBX 106 have completed, when a voicemail is deposited in a user's mailbox, PBX 106 sends a NOTIFY message to pseudo voicemail 114, which, in turn, is forwarded to a turret user. This causes a signal such as a message-waiting signal to be communicated to a corresponding turret 122 on turret system 102 which can be used to indicate to the user that a voicemail message has been deposited by, for example, turning on a message indicator on turret 122 (not shown).

Figure 5:
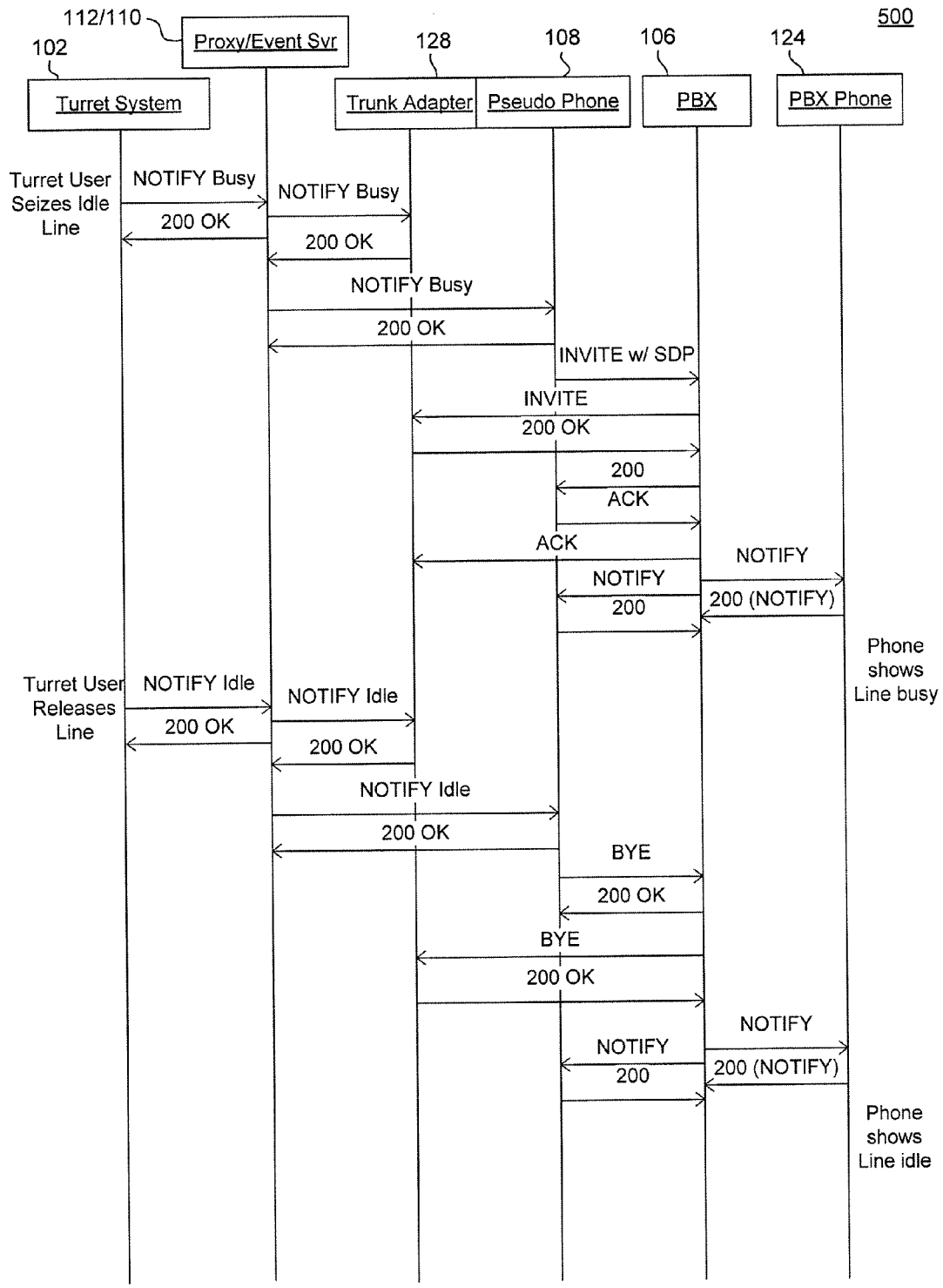
FIG. 5 depicts an example line sharing use case where a turret user seizes an idle line and later releases it in accordance with an example embodiment of the present invention.

FIG. 5 depicts an example line sharing use case 500 where a turret user seizes an idle shared line and later releases it. When a user seizes an idle line, turret system 102 communicates a busy signal via a NOTIFY (Busy) message to Proxy/Event Svr 112/110. In turn, Proxy/Event Svr 112/110 propagates the NOTIFY (Busy) signal to both trunk adapter 128 and pseudo-phone 108. Since the line is now showing busy on the turrets, it must be shown busy on the PBX phones as well. Pseudo-phone 108 has the responsibility of making the corresponding line busy in the PBX 106. This is accomplished by pseudo-phone 108 placing an outbound call to PBX 106. Particularly, pseudo-phone 108 sends an INVITE to PBX 106. The PBX 106 routes the call to the trunk adapter 128, which realizing that this call was initiated by pseudo-phone 108, auto-answers the call. This way a call is established on the BLA line in the PBX 106 and it communicates the busy status to PBX phone 124 in its NOTIFY message. As shown, since pseudo-phone 108 is also a BLA member of the same shared line, PBX 106 also sends the NOTIFY message to pseudo-phone 108.

When the turret user releases the line, turret system 102 communicates a NOTIFY Idle message to Proxy/Event Svr 112/110, which in turn, propagates the message to trunk adapter 128 and pseudo-phone 108. To release the line on the PBX side, pseudo-phone 108, in turn, sends a BYE message to PBX 106, which is forwarded to trunk adapter 128. PBX 106 also communicates a NOTIFY message to pseudo-phone 108 and PBX phone 124 to cause PBX phone 124 and pseudo-phone 108 to show that the line is now idle.

Figure 6:
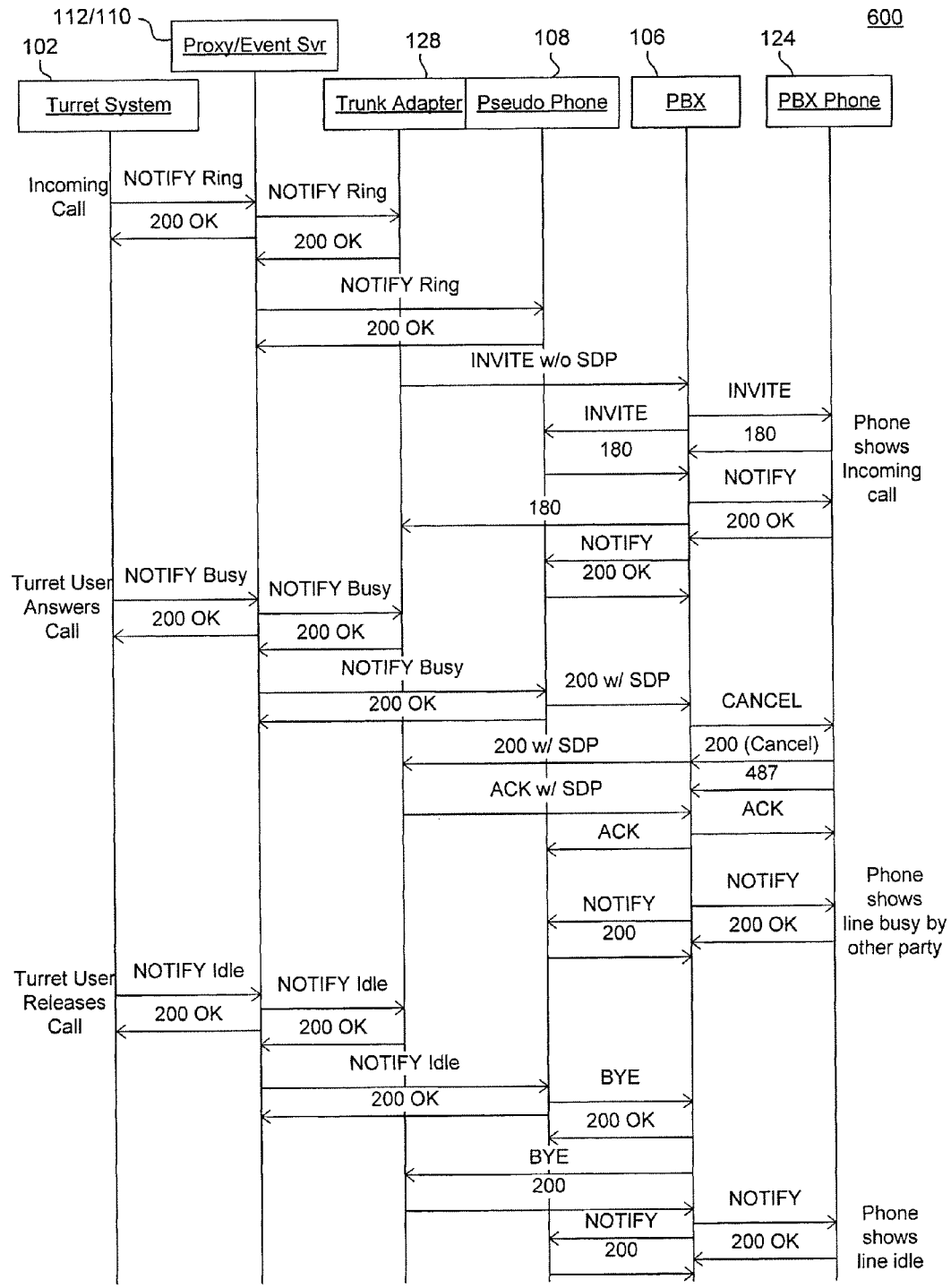
FIG. 6 depicts a line sharing use case where a turret user answers an incoming call in accordance with an example embodiment of the present invention.

FIG. 6 depicts a line sharing use case 600 where a turret user answers an incoming call in accordance with an example embodiment of the present invention. Upon receiving an incoming call, turret system 106 notifies the proxy/event svr 112/110 that the shared line is currently ringing with a NOTIFY (Ring) message. In turn, proxy/event svr 112/110 notifies trunk adapter 128 and pseudo phone 108 with a NOTIFY (Ring) message. Trunk adapter 128 places an outbound call to the corresponding shared line on the PBX 106. The PBX 106 receives the SIP INVITE signal and as a result indicates an incoming call to all the members of the BLA group including the PBX phone 124 and pseudo-phone 108. The PBX phone 124 alerts its user of the incoming call and provides the user an opportunity to answer the call.

If the turret user answers the call, turret system 102 sends a NOTIFY Busy signal that propagates through the communications system 100 as shown in FIG. 6. Particularly, turret system 102 communicates a NOTIFY (Busy) signal to proxy/event svr 112/110, which communicates the NOTIFY (Busy) signal to trunk adapter 128 and pseudo-phone 108. Pseudo-phone 108, which had previously received an incoming call signal (INVITE) from the PBX 106, now answers to PBX 106 by sending it a 200 with SDP ("Session Description Protocol") message. PBX 106, in turn, cancels the ringing on PBX phone 124 with a CANCEL message and in its NOTIFY message signals PBX phone 124 to show that the line is busy. In addition, PBX 106 communicates the NOTIFY message indicating that the line is busy to pseudo-phone 108 since pseudo-phone 108 is a member of the same BLA group as PBX phone 124. As a result PBX phone 124 indicates that the shared line is being used by a turret 122 on turret system 102. If the turret user releases the call the line return to idle as discussed above with respect to FIG. 5 and also as shown again in FIG. 6.

Figure 7:
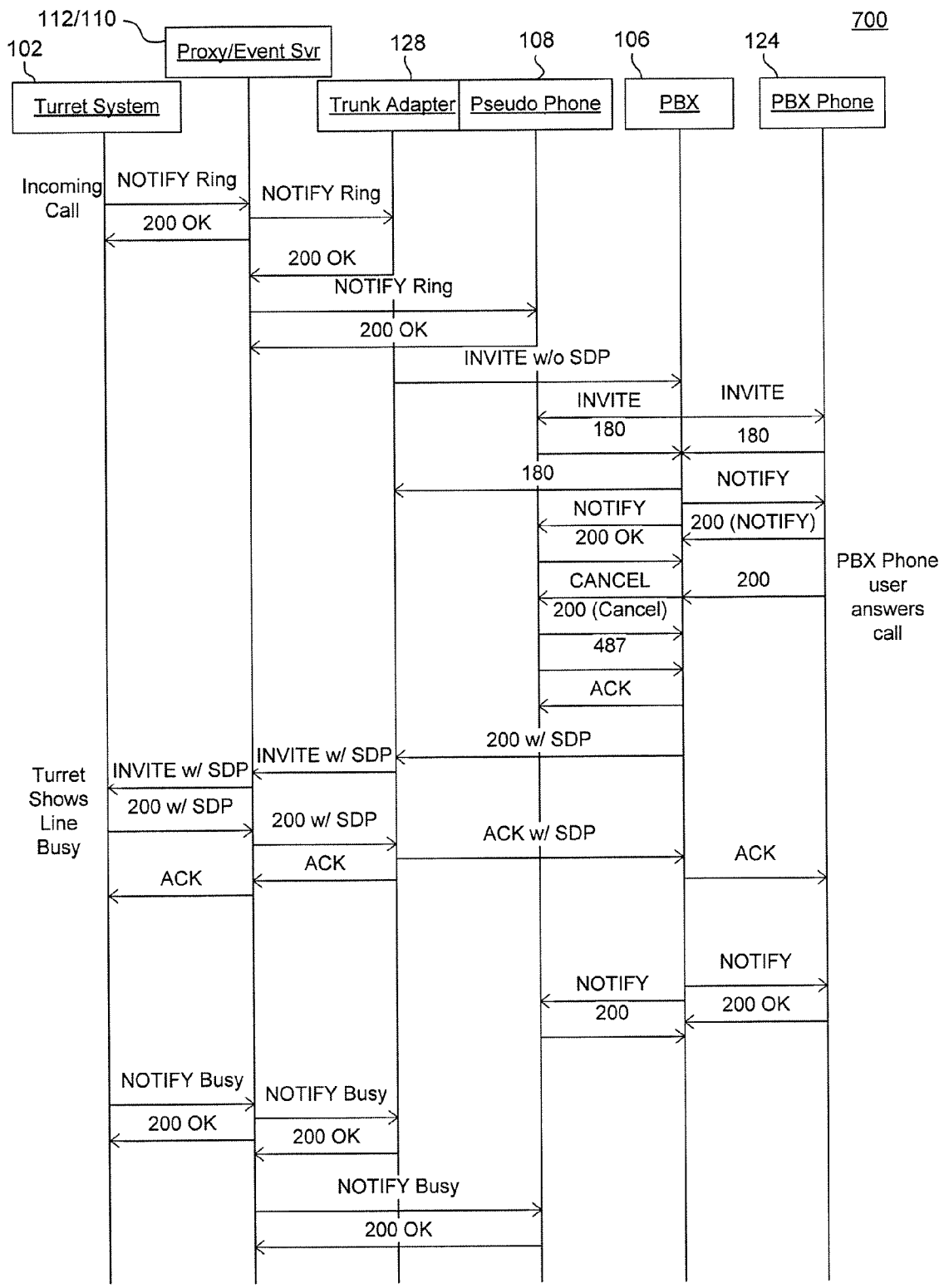
FIG. 7 depicts an example line sharing use case where a PBX extension answers an incoming call in accordance with an example embodiment of the present invention.

FIG. 7 depicts an example line sharing use case 700 where a PBX extension answers an incoming call. As shown in FIG. 7, an incoming call causes a NOTIFY (Ring) message to propagate through communication system 100, as described above with respect to FIG. 6. In the scenario shown in FIG. 7, however, a PBX phone user answers the call on PBX phone 124, causing it to send a SIP 200 response message to PBX 106 which, in turn, initiates a CANCEL request to other members of the BLA group to cancel the ringing signal associated with the call's INVITE request. The CANCEL request is communicated to pseudo-phone 108. In addition a SIP 200 with SDP message is communicated to trunk adapter 128 to indicate to turret system 102 that the call has been answered. This causes turret 122 to shown that the shared line 120 is busy. In return, turret system 102 sends a NOTIFY (Busy) signal to both trunk adapter 128 and pseudo-phone 108.

Figure 8:
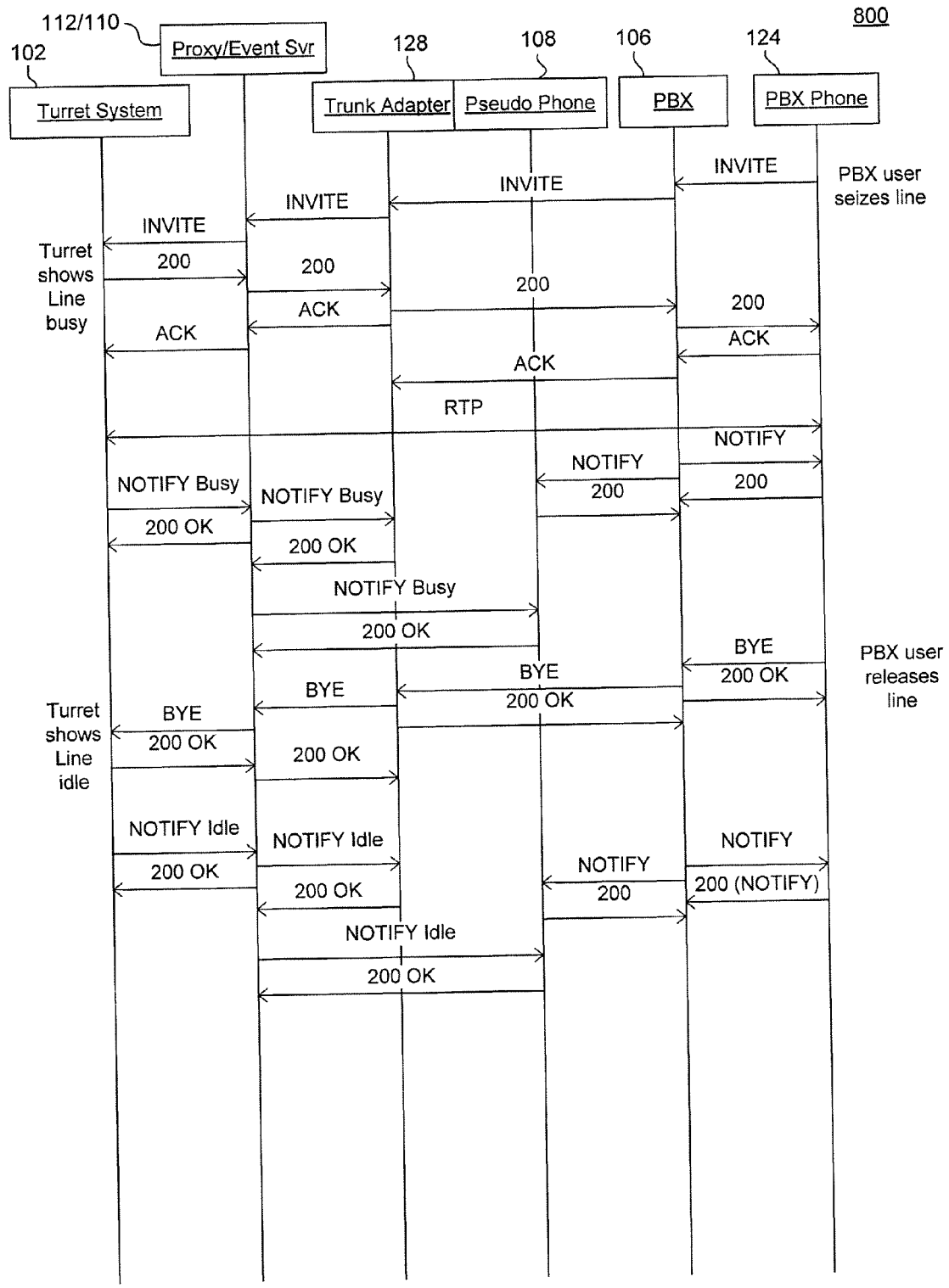
FIG. 8 depicts an example line sharing use case where a PBX user seizes an idle line and later releases it in accordance with an example embodiment of the present invention.

FIG. 8 depicts an example line sharing use case 800 where a PBX user seizes an idle line and later releases it. When a user seizes a line with PBX phone 124, PBX phone 124 communicates an INVITE message to PBX 106, which propagates to turret system 102 via trunk adapter 104 and proxy/events svr 112/110. This causes turret system 102 and PBX 106 to show that the line is busy with a NOTIFY message while the RTP communications are in progress. After a user causes PBX phone 124 to release the line, PBX phone 124 communicates a BYE message which is propagated through PBX 106, trunk adapter 128, proxy/events svr 112/110, and finally to turret system 102. Both turret system 102 and PBX 106, in turn, communicate that the line is idle with NOTIFY messages.

Figure 9:
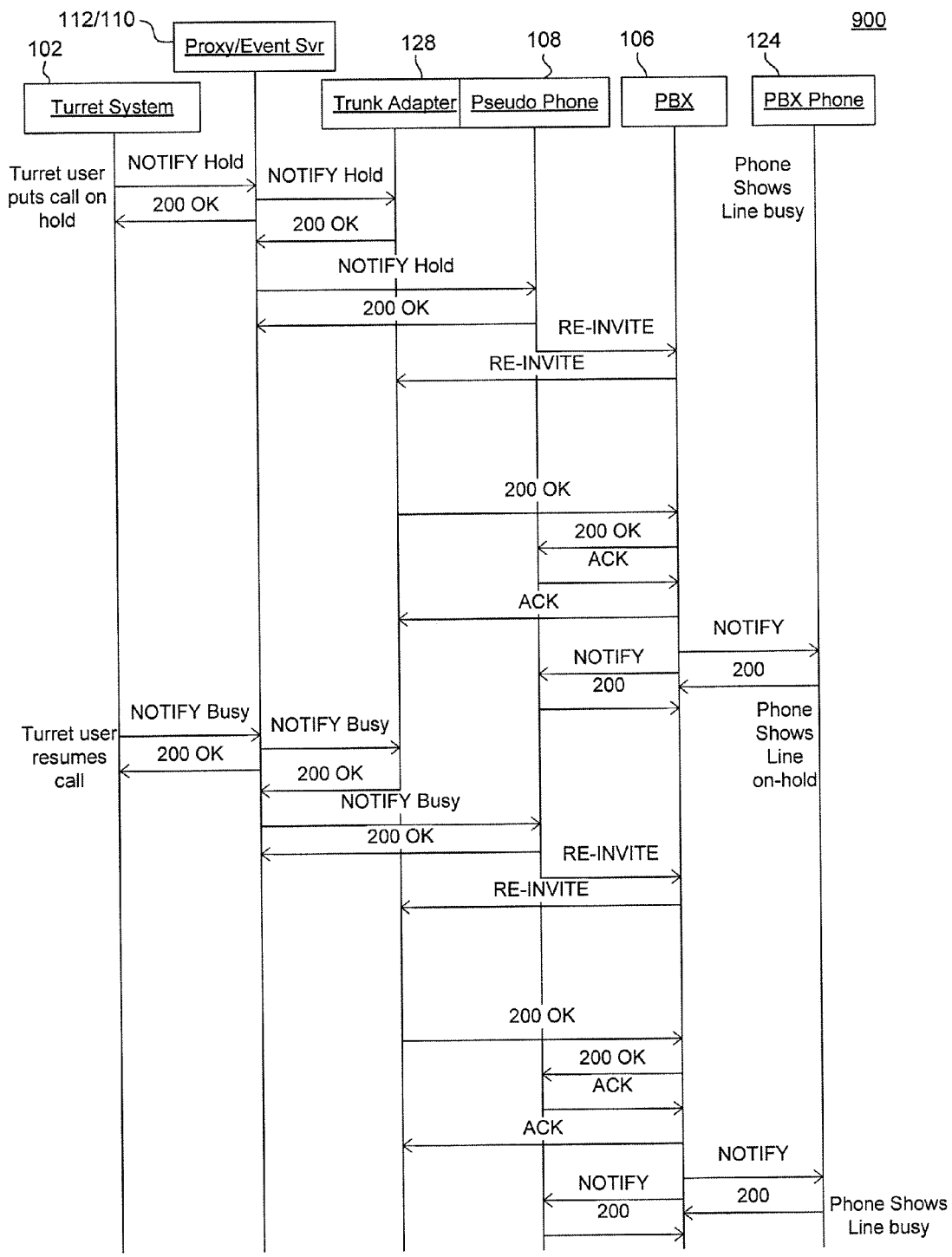
FIG. 9 depicts an example line sharing use case where a turret user places a call on hold and later picks it up in accordance with an example embodiment of the present invention.

FIG. 9 depicts an example line sharing use case 900 where a turret user places a call on hold and later picks it up. When a turret user places a call on hold, turret system 102 communicates a NOTIFY (Hold) message to Proxy/Event Svr 112/110. In turn, Proxy/Event Svr 112/110 communicates the NOTIFY (Hold) message to both trunk adapter 128 and pseudo-phone 108. Pseudo-phone 108 communicates a RE-INVITE message to PBX 106. In turn, the PBX 106 communicates a RE-INVITE message to trunk adapter 128. Both these RE-INVITE messages serve as mid-session modification requests for placing the corresponding SIP session on-hold. Before the call is placed on hold, the PBX phone 124 shows that the line is busy. Once the hold process completes, PBX 106 communicates a NOTIFY message to both PBX phone 124 and pseudo-phone 128 to show that the line is on hold.

When a turret user resumes a call, turret system 102 communicates a NOTIFY (Busy) message which is propagated throughout communication system 100 via Proxy/Event Svr 112/110, trunk adapter 128 and pseudo-phone 108. In addition, pseudo-phone 128 communicates another RE-INVITE message to PBX 106 which in turn communicates that message to trunk adapter 128. The purpose of these RE-INVITEs is to resume a held session. PBX 106 communicates a NOTIFY message to both PBX phone 124 and pseudo-phone 128 to show that the line is busy. This causes PBX phone 124 to show that the line is busy and no longer on hold.

Figure 10:
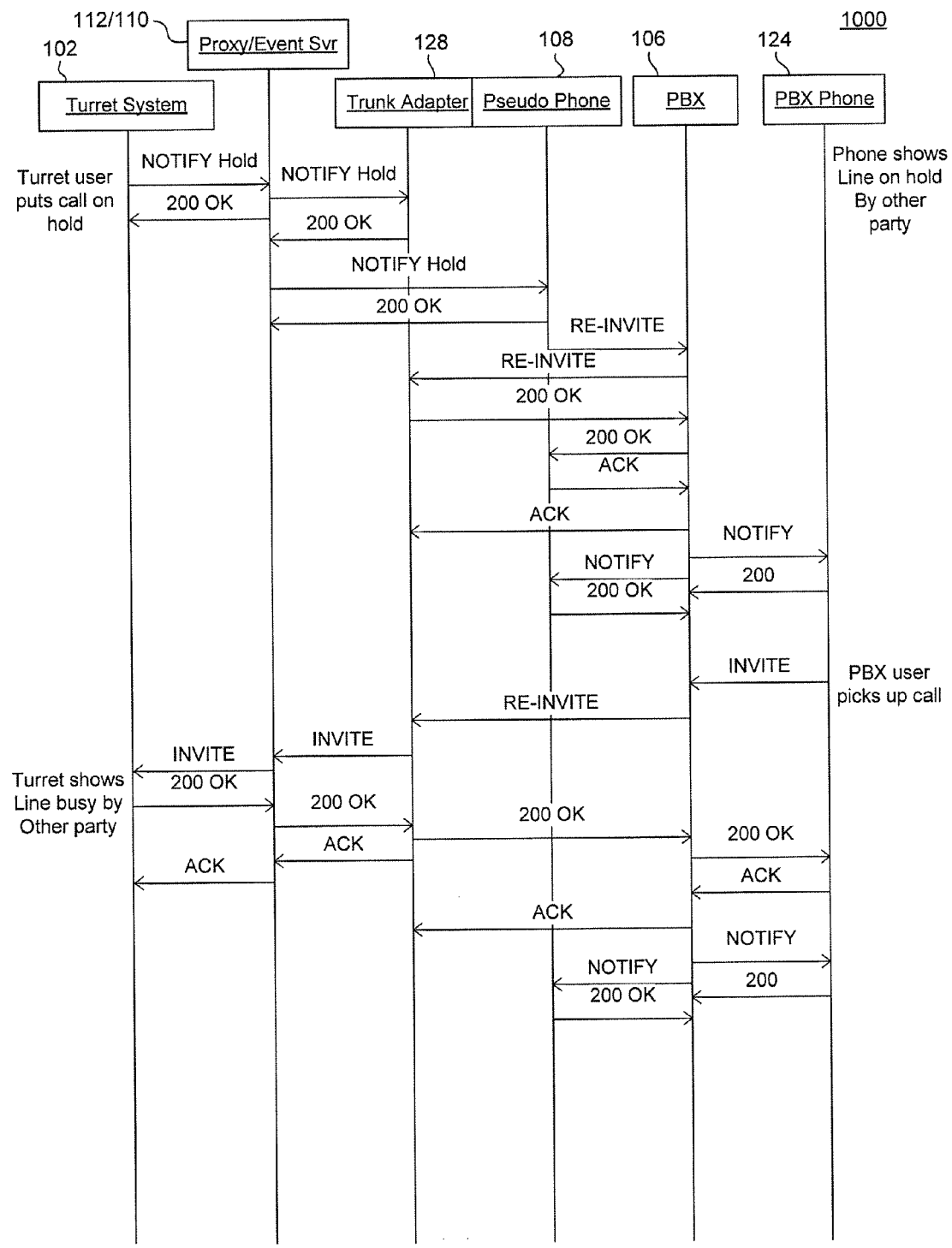
FIG. 10 depicts an example line sharing use case where a turret user places a call on hold and a PBX user later picks up the call in accordance with an example embodiment of the present invention.

FIG. 10 depicts an example line sharing use case 1000 where a turret user places a call on hold and a PBX user later picks up the call. When a turret user places a call on hold the PBX phone 124 and turret system 102 show that the line is on hold as described above with respect to FIG. 9. When a PBX user picks up the call on PBX phone 124, the PBX phone 124 communicates an INVITE message to PBX 106 which in turn communicates a RE-INVITE message to trunk adapter 128. Trunk adapter 128, in turn, communicates the INVITE message to Proxy/Event Svr 112/110 which forwards the INVITE message to turret system 102. This causes turret system to show the line is busy by another party. In addition, PBX 106 communicates a NOTIFY message to both PBX phone 124 and pseudo-phone 108 to show that the line is busy.

Figure 11:
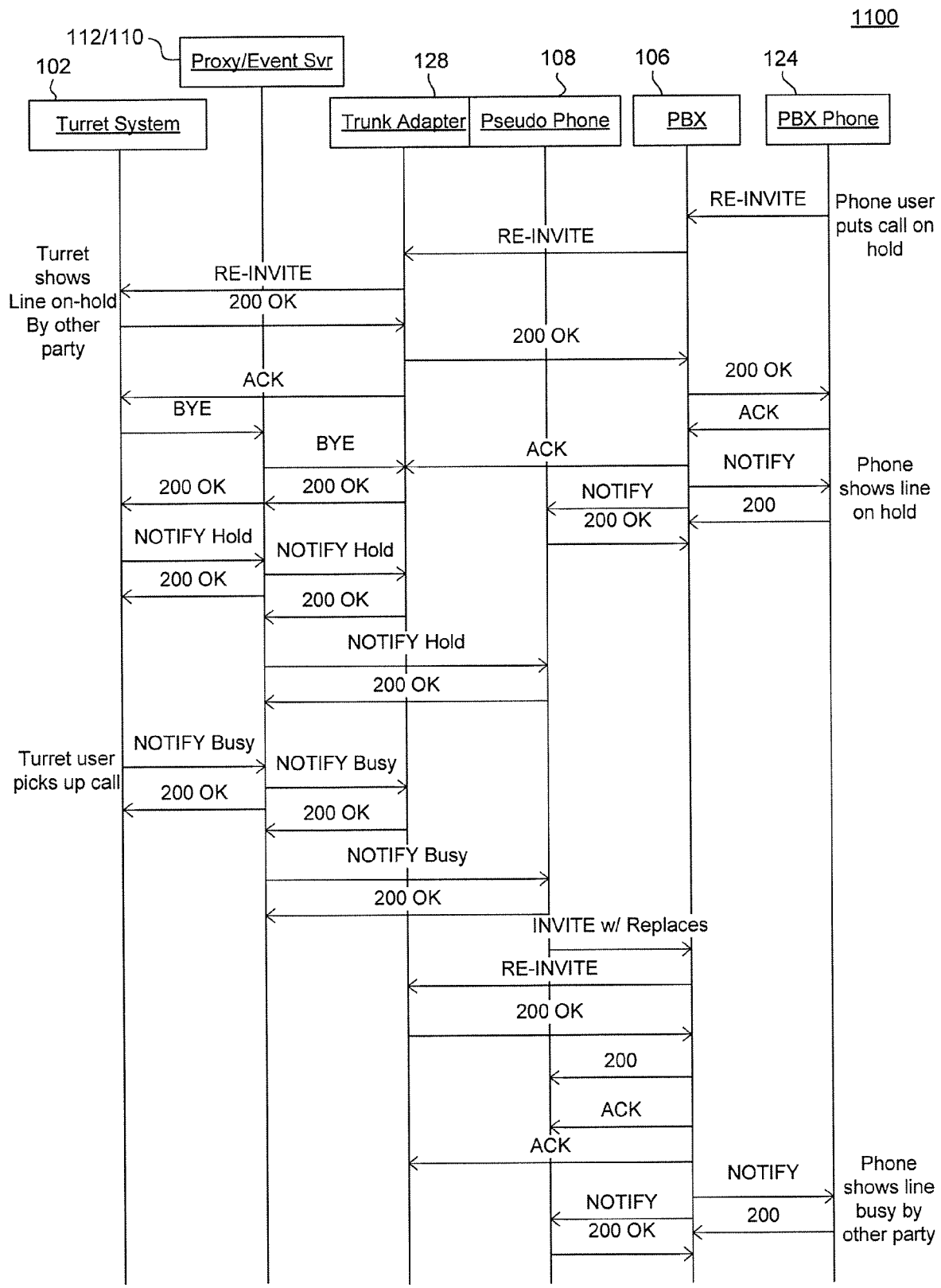
FIG. 11 depicts an example line sharing use case where a PBX user places a call on hold and a Turret user later picks up the call in accordance with an example embodiment of the present invention.

FIG. 11 depicts an example line sharing use case 1100 where a PBX user places a call on hold and a Turret user later picks up the call. When a PBX phone user on PBX phone 124 places a call on hold, PBX phone 124 communicates a RE-INVITE message to PBX 106. PBX 106 communicates the RE-INVITE message to trunk adapter 128, which in turn communicates the message to turret system 102. This causes the turret system to show that the line is on hold by another party. In addition, PBX 106 communicates a NOTIFY message to both PBX 106 and pseudo-phone 108 to show that the line is on hold. Similarly, turret system 102 communicates a NOTIFY (Hold) message to Proxy/Event Svr 112/110 which in turn communicates the message to both trunk adapter 128 and pseudo-phone 108.

If a turret user picks up the call, turret system 102 communicates a NOTIFY (Busy) message to Proxy/Event Svr 112/110 which communicates the message to both trunk adapter 128 and pseudo-phone 108. Pseudo-phone 108 then communicates an INVITE message with a Replaces header according to RFC 3891 to PBX 106 which communicates a RE-INVITE message to trunk adapter 128. In addition, PBX 106 communicates a NOTIFY message to both PBX phone 124 and pseudo-phone 128 causing PBX phone 124 to show that the line is busy by another party.

Figure 12:
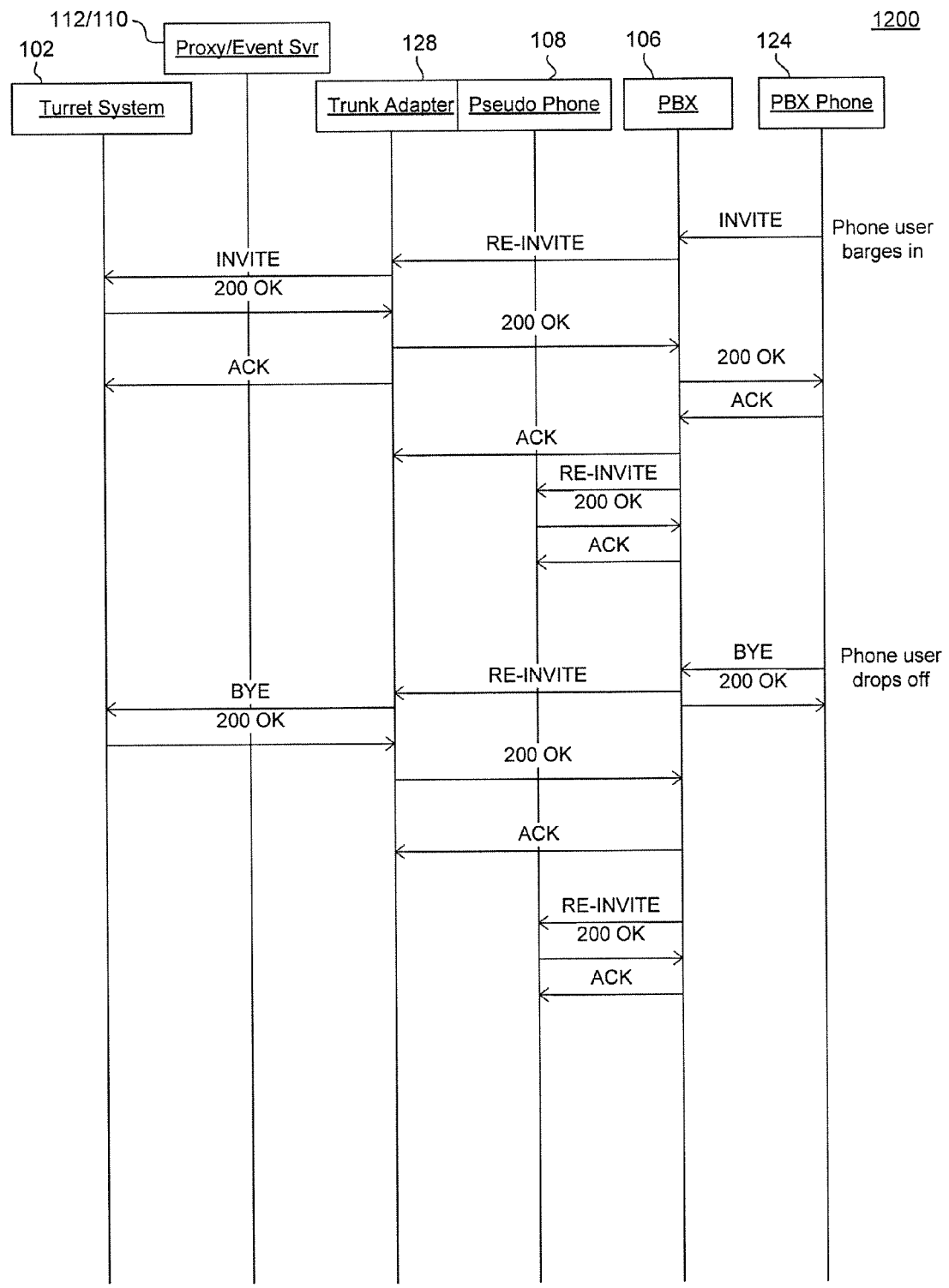
FIG. 12 depicts an example line sharing use case 1200 where a PBX user barges-in and later drops off.

FIG. 12 depicts an example line sharing use case 1200 where a PBX user barges-in and later drops off. When a phone user barges in on a line, PBX phone 124 communicates an INVITE message to PBX 106 which communicates a RE-INVITE message to trunk adapter 128 and pseudo-phone 108. Trunk adapter 128 communicates an INVITE message to turret system 102. When the phone user drops off, PBX phone 124 communicates a BYE message to PBX 106 which in turn communicates a RE-INVITE message to trunk adapter 128 and pseudo-phone 108. Trunk adapter 128 also communicates a BYE message to turret system 102.

FIGS. 13A and 13B are example SIP message traces related to a shared resource SIP event-package. Traces 1302, 1304, 1306, 1310, 1312 and 1316 include standard SIP headers using the SIP definitions described above. In this example the traces 1308 and 1314 contain line state information for a particular extension. As shown in FIG. 13A, extension 201401145 (i.e., "Extn=201401145") initially has a status of idle (i.e., "Status=Idle"). In FIG. 13B, the status of this extension has changed to busy. This causes a packet to be communicated throughout the system (i.e., via the SIP server via pseudo-phone 108 to notify the endpoints sharing this line that the line is busy. Particularly, the value of the status parameter represents a busy state (i.e., "Status=Busy"). In this case, the CLI parameter indicates that the CLI (calling line identification) is not being provided in a SIP NOTIFY message (i.e., "CLI=No"), and the CallSrc parameter indicates that the extension is external.

In a separate embodiment, the resource sharing with a SIP PBX can be accomplished if the PBX is enhanced to support the x-ipc-resource-status event package over its SIP trunk interface. The actual implementation of the x-ipc-resource-status event-package may be inside the PBX switching system or one of its adjunct systems, such as a system that interacts with the PBX over computer telephony interface ("CTI"). For clarity, the PBX and all of its adjunct systems are referred to herein as a PBX.

The example embodiments of the invention (i.e., system 100, processes 200-1200 or any part(s) or function(s) thereof) may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general-purpose digital computers or similar devices.

From a hardware standpoint, a computer system typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a computer system typically includes software resident on a storage media (e.g., a disk drive or memory card), which, when executed, directs the computer system in performing transmission and reception functions. The computer system software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, computer systems can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

Although for convenience the turret system 102, SIP server 104 and SIP PBX 106 are shown as each being a single computer system, in other example embodiments these may include plural separate computer systems, wherein each is dedicated to a separate application, such as, for example, a data application, a voice application, and a video application.

Software embodiments of the example embodiments presented herein may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-13 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the processes recited in the claims need not be performed in the order presented.

What is claimed:

1. An apparatus for sharing one or more resources across a turret system and a telephone exchange, comprising:
    a processor operating as a Session Initiation Protocol back-to-back user agent (SIP B2BUA) and configured to:
        register the SIP B2BUA into the turret system and the telephone exchange, wherein the SIP B2BUA includes a finite state machine configured to emulate a resource shared by a first predetermined device of the turret system and a second predetermined device of the telephone exchange,
        receive a state change notification corresponding to the resource from the turret system, and
        signal to the telephone exchange a message containing the state change notification to cause the second predetermined device of the telephone exchange to have a corresponding state.

2. The apparatus of claim 1, wherein the processor is further configured to subscribe to the turret system and the telephone exchange to obtain corresponding line state change notifications.

3. The apparatus of claim 1, wherein at least one of the first predetermined device and the second predetermined device is at least one of a telephone device, a fax device, a voicemail system device, a speakerphone device, a push-to-talk device, a video device, and a data communications device.

4. The apparatus of claim 1, wherein the processor is further configured to validate the state change notification.

5. The apparatus of claim 1, wherein the resource is at least one of a telephone resource, a fax resource, a voicemail system resource, a speakerphone resource, a push-to-talk resource, a video resource, and a data communications resource.

6. A method for sharing one or more resources across a turret system and a telephone exchange, comprising the steps of:
    registering, by a processor operating as a Session Initiation Protocol back-to-back user agent (SIP B2BUA), the SIP B2BUA into the turret system and the telephone exchange, wherein the SIP B2BUA includes a finite state machine configured to emulate a resource shared by a first predetermined device of the turret system and a second predetermined device of the telephone exchange;
    receiving a state change notification corresponding to the resource from the turret system; and
    signaling to the telephone exchange a message containing the state change notification to cause the second predetermined device of the telephone exchange to have a corresponding state.

7. The method of claim 6, further comprising the step of:
    subscribing to the turret system and the telephone exchange to obtain corresponding line state change notifications.

8. The method of claim 6, wherein the at least one of the first predetermined device and the second predetermined device is at least one of a telephone device, a fax device, a voicemail system device, a speakerphone device, a push-to-talk device, a video device, and a data communications device.

9. The method of claim 6, further comprising the step of:
    validating the state change notification.

10. The method of claim 6, wherein the resource is at least one of a telephone resource, a fax resource, a voicemail system resource, a speakerphone resource, a push-to-talk resource, a video resource, and a data communications resource.

11. A computer program product comprising a computer usable medium having control logic stored therein for causing a computer to share one or more resources across a turret system and a telephone exchange, said control logic comprising:
    computer readable program code means for causing the computer to register a Session Initiation Protocol back-to-back user agent (SIP B2BUA) into the turret system and the telephone exchange, wherein the SIP B2BUA includes a finite state machine configured to emulate a resource shared by the turret system and the telephone exchange;
    computer readable program code means for causing the computer to receive a state change notification corresponding to the resource from the turret system; and
    computer readable program code means for causing the computer to signal to the telephone exchange a message containing the state change notification to cause the second predetermined device of the telephone exchange to have a corresponding state.

12. The computer program product of claim 11, further comprising:
    computer readable program code means for causing the computer to subscribe to the turret system and the telephone exchange to obtain corresponding line state change notifications.

13. The computer program product of claim 11, wherein at least one of the first predetermined device and the second predetermined device is at least one of a telephone device, a fax device, a voicemail system device, a speakerphone device, a push-to-talk device, a video device, and a data communications device.

14. The computer program product of claim 11, further comprising :
    computer readable program code means for causing the computer to validate the state change notification.

15. The computer program product of claim 11, wherein the resource is at least one of a telephone resource, a fax resource, a voicemail system resource, a speakerphone resource, a push-to-talk resource, a video resource, and a data communications resource.

16. The apparatus according to claim 1, wherein the processor is further configured to:
    receive a second state change notification corresponding to the resource from the telephone exchange, and signal, to the turret system a second message containing the second state change notification to cause the first predetermined device of the turret system to have a corresponding state.

17. The method according to claim 6, further comprising the steps of:
    receiving a second state change notification corresponding to the resource from the telephone exchange; and
    signaling to the turret system a second message containing the second state change notification to cause the first predetermined device of the turret system to have a corresponding state.

18. The computer program product of claim 11, further comprising:
    computer readable program code means for causing the computer to receive a second state change notification corresponding to the resource from the telephone exchange; and
    computer readable program code means for causing the computer to signal to the turret system a second message containing the second state change notification to cause the first predetermined device of the turret system to have a corresponding state.

* * * * *

UNITED STATES PATENT AND TRADEMARK OFFICE
CERTIFICATE OF CORRECTION

| | | |
|---|---|---|
| PATENT NO. | : 8,290,138 B2 | Page 1 of 1 |
| APPLICATION NO. | : 11/943800 | |
| DATED | : October 16, 2012 | |
| INVENTOR(S) | : Aseem Bakshi et al. | |

It is certified that error appears in the above-identified patent and that said Letters Patent is hereby corrected as shown below:

In the Claims

<u>COLUMN 13:</u>

Claim 16, Line 1, "signal," should read --signal--.

Signed and Sealed this
Eighth Day of April, 2014

Michelle K. Lee
*Deputy Director of the United States Patent and Trademark Office*